(12) United States Patent
Ghabra et al.

(10) Patent No.: US 7,580,696 B2
(45) Date of Patent: Aug. 25, 2009

(54) SELF-ALIGNING VEHICULAR TRANSMITTER SYSTEM

(75) Inventors: Riad Ghabra, Dearborn Heights, MI (US); Yi Luo, Ypsilanti, MI (US); Oingfeng Tang, Novi, MI (US)

(73) Assignee: Lear Corporation, Southfield, MI (US)

( * ) Notice: Subject to any disclaimer, the term of this patent is extended or adjusted under 35 U.S.C. 154(b) by 726 days.

(21) Appl. No.: 11/011,364

(22) Filed: Dec. 14, 2004

(65) Prior Publication Data

US 2006/0125599 A1 Jun. 15, 2006

(51) Int. Cl.
*H04B 1/06* (2006.01)
(52) U.S. Cl. .................. 455/352; 455/99; 455/345; 455/420; 455/67.11; 455/569.2
(58) Field of Classification Search .................. 455/95, 455/99, 115.3, 120, 161.3, 352, 345, 101, 455/419–421, 67.11, 569.2, 575.1, 346, 411; 340/825.69, 825.72, 825.31, 825.34, 525, 340/5.64, 5.61, 572.6, 10.3, 10.4, 10.33, 340/10.34, 10.22; 375/347, 202, 268; 343/700, 343/790
See application file for complete search history.

(56) References Cited

U.S. PATENT DOCUMENTS

| | | | |
|---|---|---|---|
| 4,888,763 A | | 12/1989 | Hatfield et al. |
| 5,844,517 A | * | 12/1998 | Lambropoulos ............ 341/176 |
| 6,091,343 A | * | 7/2000 | Dykema et al. ........ 340/825.69 |
| 6,236,333 B1 | * | 5/2001 | King .......................... 340/5.61 |
| 6,625,459 B1 | | 9/2003 | Ojard et al. |
| 6,710,701 B2 | * | 3/2004 | Leatherman ................ 340/5.61 |
| 6,801,134 B1 | | 10/2004 | Juzswik |
| 7,190,253 B2 | * | 3/2007 | Shimomura .................. 340/5.3 |
| 7,292,134 B2 | * | 11/2007 | Conner et al. .............. 340/5.64 |
| 2004/0037365 A1 | * | 2/2004 | King et al. ................... 375/268 |
| 2004/0183714 A1 | | 9/2004 | Yamashita et al. |

FOREIGN PATENT DOCUMENTS

| | | |
|---|---|---|
| DE | 103 04 463 | 3/2004 |
| JP | 2000054698 | 2/2000 |
| JP | 2000054700 | 2/2000 |
| JP | 20003244013 | 8/2003 |
| WO | WO 02/07993 | 1/2002 |

* cited by examiner

*Primary Examiner*—Sujatha Sharma
(74) *Attorney, Agent, or Firm*—MacMillan, Sobanski & Todd, LLC

(57) ABSTRACT

A method is provided for self-aligning a transmitting RF frequency between a portable transceiving device and a base station transceiving device. The base station transceiving device is mounted in a vehicle for controlling a vehicle accessory function in response to RF messages broadcast between the transceiving devices. The RF signal is transmitted from one of the portable or base station transceiving devices to the other of the portable or base station transceiving devices. The frequency of the RF signal is varied during the transmission. A RSSI value of a received RF signal is measured at selected frequencies. A respective frequency having a maximum RSSI value is determined. At least a portion of a subsequent RF message is transmitted from one of the portable transceiving device or base station transceiving device using the respective frequency.

17 Claims, 3 Drawing Sheets

SELF-ALIGNING VEHICULAR TRANSMITTER SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates in general to aligning the RF transmitting signal between a vehicle related transmitting device and a vehicle related receiving device, and more specifically, to a remote vehicle accessory transmitter and a vehicle based control module for aligning the transmitting and receiving center frequencies.

2. Description of the Related Art

Transmitting devices such as remote keyless entry (RKE) fobs typically transmit data on a modulated signal to a receiving device such as a vehicle based remote keyless entry module. The signal is modulated on a carrier wave by the RKE fob at a respective center frequency and is received by the RKE module that is tuned to the same respective center frequency.

For a two-way communication between a RKE module and a RKE fob, communication from the RKE module to the RKE fob is often limited in range. This is primarily due to the limited size of the antenna packaged within the RKE fob and the limited power supply of the RKE fob. Antennas that are small in size as that of the RKE fob combined with the RKE fob's limited power (i.e., small power supply) results in low gain thereby limiting the reception range of the RKE fob. In addition, the power level emissions of RF transmitted signals are limited as the Federal Communications Commission (FCC) maintains regulations on the maximum emission that may be generated by respective transmitted RF signal for a respective application.

To optimize a long-range signal transmission from the RKE module to the RKE fob having low gain, the bandwidth of the RKE fob for receiving a transmitted signal must be narrowed. The greater the distance of signal transmission between the transmitting and receiving devices, the narrower the bandwidth must be to receive the signal. Narrowing the bandwidth too much will not allow the received signal to fall within the receiver bandwidth if the transmitter and receiving center frequencies are in a mis-alignment condition. Thus it is imperative to maintain the alignment of the center frequencies between the transmitter and the receiver when transmitting long distances. Typically the transmitter and receiver are calibrated to a specific center frequency where a balance is maintained between the allowable distance that a RF signal is transmitted and the allowable width that a bandwidth may be narrowed given the maximum allowable transmitting distance.

Under certain conditions such as temperature changes, the center frequency of the transmitting device may shift. Small shifts in the center frequency are typically tolerated by the receiving device due to the receiving device having a sufficient bandwidth for receiving the signal with small center frequency shifts. This allows for small discrepancies in the alignment of the center frequencies between the transmitting device and receiving device due to environmental changes or possible circuit tolerances. Devices such as RKE modules and RKE fobs typically are permanently tuned to a respective center frequency for transmitting and receiving signals, and as stated earlier, the RKE fob may have a small bandwidth for receiving signals from the RKE module. Maintaining a small bandwidth at a permanently tuned center frequency make the transmitting system susceptible to the issues described above. Even if the RKE module and RKE fob were tunable, a method would be required to calibrate the center frequencies of the two devices. Requiring the operator to knowingly and constantly calibrate the two devices would be burdensome.

SUMMARY OF THE INVENTION

The present invention has the advantage of self-aligning the center frequencies between a vehicle-based transceiving device and a portable transceiving device during a normal operation of the two communication devices without requiring the operator to perform additional calibration steps.

In one aspect of the present invention, a method is provided for self-aligning a transmitting RF frequency between a portable transceiving device and a base station transceiving device. The base station transceiving device is mounted in a vehicle for controlling a vehicle accessory function in response to RF messages broadcast between the transceiving devices. The RF signal is transmitted from one of the portable or base station transceiving devices to the other of the portable or base station transceiving devices. The frequency of the RF signal is varied during the transmission. A RSSI value of a received RF signal is measured at selected frequencies. A respective frequency having a maximum RSSI value is determined. At least a portion of a subsequent RF message is transmitted from one of the portable transceiving device or base station transceiving device using the respective frequency.

DETAILED DESCRIPTION OF PREFERRED EMBODIMENTS

Figure 1:
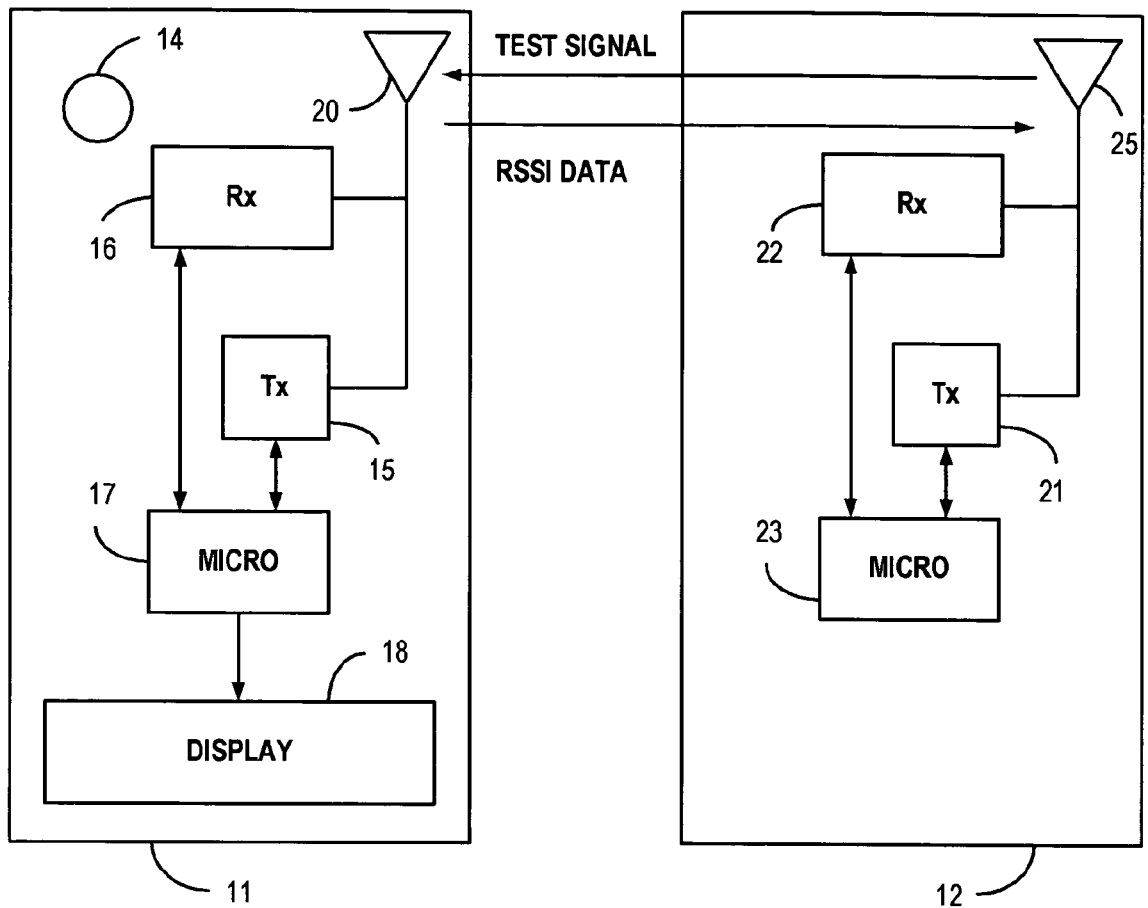
FIG. 1 is a self-tuning transmission system between a remote transceiving device and a base station transceiving device according to a preferred embodiment of the present invention.

FIG. 1 illustrates a self-tuning RF transmission system between a remote transceiving device 11 and a base station transceiving device 12. The portable transceiving device 11 includes a transmitting circuit 15 for broadcasting RF messages to a receiving circuit 22 within the base station transceiving device 12. The portable transceiving device 11 may include a remote keyless entry (RKE) fob for broadcasting RF messages for performing vehicle entry functions such as door unlock/lock functions, trunk unlatch, sliding door operation, and panic alarm. The portable transceiving device 11 may also broadcast RF messages for remotely starting/stopping a vehicle engine. Furthermore, the portable transceiving device 11 may be disposed within each of the vehicle tires for broadcasting data relating to the pressure of the vehicle tires.

The base station transceiving device 12 includes a vehicle based control module for activating a vehicle accessory operation in response to receiving a respective RF message such as a RKE module for activating vehicle entry functions. The base station transceiving device 12 may also include a vehicle based control module for remotely starting/stopping a vehicle engine in response to a received RF message or provide an alert warning if tire pressure is below a predetermined threshold.

The portable transceiving device 11, as shown in FIG. 1, includes the transmitting circuit 15 and a receiving circuit 16 for transmitting and receiving RF messages (i.e., data messages) as well as RF signals (i.e., test signals). Alternatively, the transmitting circuit 15 and the receiving circuit 16 may be combined into an integrated circuit (e.g., transceiver) rather than two separate integrated circuits. The receiving circuit 16 of the portable transceiving device 11 measures a received signal strength (RSSI) of a received RF signal. The RSSI is indicative of the power of the received RF signal. A controller 17, such as a microcontroller, processes received signals from the receiving circuit 16 and controls outgoing data transmissions via the transmitting circuit 15. An antenna 20 integrated within the portable transceiving device 11 is provided to receive incoming RF messages and RF signals and broadcast outgoing RF messages and RF signals. A display screen 18 is disposed in the portable transceiving device 11 for displaying information received from the base station transceiving device 12. Such information may include status information relating to a vehicle accessory function such as doors unlocked, trunk unlatched, engine running, etc.

The base station transceiving device 12 includes a transmitting circuit 21 and a receiving circuit 22. Alternatively, the transmitting circuit 21 and the receiving circuit 22 may be combined into an integrated circuit (e.g., transceiver) rather than two separate integrated circuits. The receiving circuit 22 of the base station transceiving device 12 measures the RSSI of a received RF signal. The base station transceiving device 12 further includes a controller 23 such as the microcontroller for processing received signals and for controlling the data transmission of output signals. Antenna 25 is provided for receiving incoming RF messages and RF signals and for broadcasting outgoing RF messages and RF signals to the portable transceiving device 11. Since the base station transmitting device 12 is packaged within the vehicle, the antenna 25 can be of any suitable length for receiving transmitted signals from the portable transceiving device 11. The antenna 20 of the portable transceiving device 11 is typically small so that it may be packaged within the portable transceiving device 11. It is therefore critical that for the bandwidth of the portable transceiving device 11 be small to receive long range transmissions from the base station transceiving device 12.

Environmental conditions such as temperature may cause a misalignment between the transmitting center frequency in the base station transmitting device 12 and the center frequency of the portable transceiving device 11. To determine whether a shift in the center frequency of base station transmitting device 12 has occurred, a test signal is transmitted from base station transmitting device 12 to the portable transceiving device 11 to determine the optimum transmitting center frequency for subsequent message transmissions.

In a preferred embodiment, the base station transceiving device 12 transmits a test signal to the portable transceiving device 11. The test signal is transmitted in response to a user actuating one of the respective vehicle accessory buttons on the portable transceiving device 11. Alternatively, the self-tuning operation may be initiated by transmitting test signals periodically at specific time intervals. As the test signal is transmitted to the portable transceiving device 11, the frequency of the transmission is varied. Preferably, the frequency is varied over a plurality of discrete frequencies spanning the normal frequency value. The receiving circuit 16 of the portable transceiving device 11 receives the test signal and measures an RSSI value for each discrete frequency. Each measured RSSI value is provided to the controller 17. The controller 17 determines which discrete frequency produces the maximum RSSI value. The frequency associated with the maximum RSSI value is transmitted via the transmitting circuit 15 to the base station transceiving device 12. The base station transceiving device 12 adjusts the transmitting frequency of the transmitting circuit 21 to the respective frequency associated with the maximum RSSI value. The transmitting circuit 21 of the base station transceiving device 12 maintains the center frequency at the respective frequency for all subsequent transmissions until a next respective frequency having a maximum RSSI value is determined.

Alternatively, the respective frequency associated with the maximum RSSI value corresponding to test signals broadcast from base station transceiving device 12 to the portable transceiving device 11 may be determined by the controller 23. As the receiving circuit 16 receives the test signals, the receiving circuit measures the RSSI of each discrete signal and simultaneously transmits each discrete RSSI value to the receiving circuit 22 of the base station transceiving device 12. The base station transceiving device 12 receives each measured discrete frequency and the associated RSSI value and determines which respective frequency has a maximum RSSI value. The optimum frequency is stored in association with the ID of the fob and then used when messages are transmitted to that fob.

In the preferred embodiment, the transmitting frequency of the transmitting circuit 15 of the portable transceiving device 11 may be self-adjusted using the same method. The test signal is transmitted in response to a user actuating one of the respective vehicle accessory buttons on the portable transceiving device 11. A test signal is transmitted from the portable transceiving device 11 to the base station transceiving device. The frequency is transmission is varied. The receiving circuit 22 of the portable transceiving device 12 receives the test signal and measures an RSSI value for each discrete frequency. Each measured RSSI value is provided to the controller 23. The controller 23 determines which discrete frequency produces the maximum RSSI value and transmits the frequency having the maximum RSSI value to the portable transceiving device 11. The portable transceiving device 11 adjusts the transmitting frequency of the transmitting circuit 15 to the respective frequency associated with the maximum RSSI value. The portable transceiving device 11 of the base station transceiving device 12 maintains the center frequency at the respective frequency for all subsequent transmissions until a next respective frequency having a maximum RSSI value is determined.

Alternatively, if the portable transceiving device 11 is transmitting the test signal to the base station transceiving device 12, the controller 23 of the base station transceiving device 12 measures the RSSI of each discrete signal and simultaneously transmit each discrete RSSI value to the receiving circuit 16 of the portable transceiving device 11. The controller 17 portable transceiving device 11 then determines the optimum transmitting frequency and then adjusts the transmitting frequency of the transmitting circuit 15 to the optimum transmitting frequency.

Figure 2:
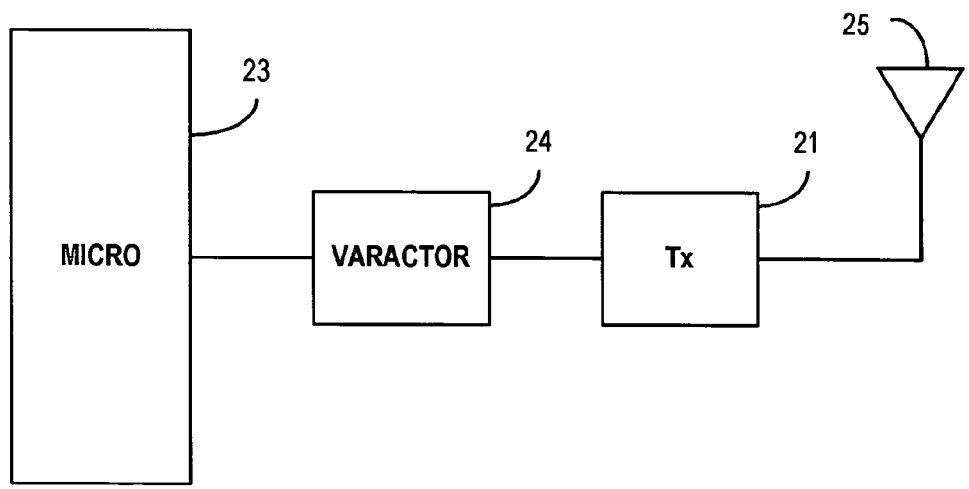
FIG. 2 is a circuit for varying the frequency of a RF signal according to a preferred embodiment of the present invention.

FIG. 2 illustrates a block diagram of a circuit for varying the frequency of the test signal generated by either the portable transceiving device 11 or base station transceiving device 12. A preferred method for varying the frequency is by varactor tuning. Varactor tuning includes tuning a circuit by using a varactor diode 24 to obtain a desired frequency. The varactor diode is electrically connected between the controller 23 and the transmitter 21. The varactor diode 24 acts as a variable capacitor to change the frequency of the oscillating signal. The controller 23 uses a digital-to-analog converter in the controller 23 to adjust the DC value supplied to the varactor diode 24. The adjustment of the DC value changes the varactor capacitance which allows the frequency of the transmitted RF test signal to be varied. In alternative embodiments, other methods may be used to vary the frequency of the test signal such as utilizing a phase locked loop. The varactor diode 24 may also be used to retune the transmitting frequency of the transmitting circuit to the optimum transmitting frequency for data transmission.

Figure 3:
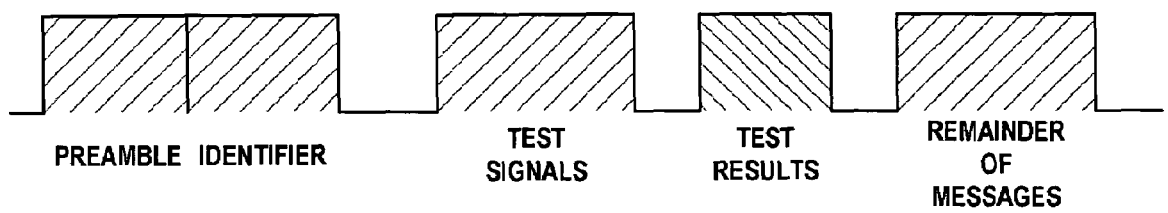
FIG. 3 illustrates two-way transmission signal between the between the between two transceiving devices according to a first preferred embodiment of the present invention.

FIG. 3 illustrates a two-way transmission signal between the between the base station transceiving device 12 and the portable transceiving device 11. In the preferred embodiment, a transmitting signal is initiated by the base station transceiving device 12 for providing status information regarding a vehicle operation (e.g., door unlocked/locked, engine running, or sliding doors open) in response to a request for a vehicle entry request by the portable transceiving device 11. The transmitting signal typically includes a data packet that contains a preamble followed by encoded data. The preamble includes a series of pulses, typically 0 to 5 volts, having a predetermined width between each pulse. The pulses typically signify that transmitted data is to follow. The preamble is used to synchronize the communication transmission between base station transceiving device 11 and the portable transceiving device 12. This ensures that the receiving device (portable transceiving device) can correctly interpret when the data transmission starts. An identifier 42 follows the preamble for identifying the base station transceiving device 41. The identifier 42 is an identification code that provides the necessary authentication so that the portable transceiving device 11 can proceed forward in communicating with the base station transceiving device 12. If the identification code is not authenticated, then the portable transceiving device will await for a next transmitted signal. The next portion of transmitted data includes a test signal. As the test signal is transmitted, the frequency of the transmission is varied. Each discrete signal is received by the portable transceiving device 11 and a respective RSSI value is measured for each discrete signal. After each discrete signal is received and the respective RSSI value is measured for each discrete signal, the controller 17 of the portable transceiving device 11 determines which discrete signal generated the maximum RSSI. A test result signal 43 (i.e., optimum transmitting frequency) is transmitted from the portable transceiving device 12 to the base station transceiving device 11. After the base station transceiving device 11 receives the test results 43, the transmitting frequency of the base station transceiving device 11 is changed to the frequency associated with the maximum RSSI value. This optimizes the remainder of the signal transmission from the base station transceiving device 11 to the portable transceiving device 12. The remainder of the messages 44 containing information regarding the status of a respective vehicle operation is transmitted to the portable transceiving device 11 using the optimum transmitting frequency.

Figure 4:
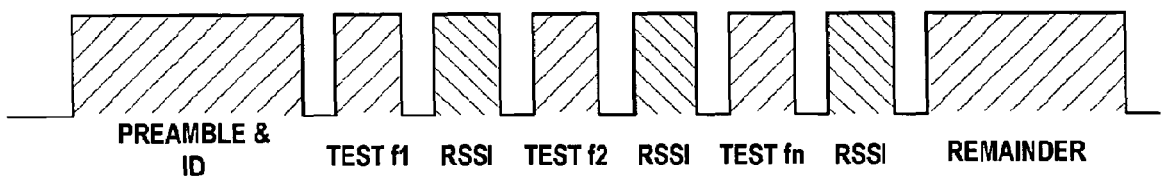
FIG. 4 illustrates two-way transmission signal between the between the between two transceiving devices according to a second preferred embodiment of the present invention.

FIG. 4 illustrates a two-way transmission signal between the between the base station transceiving device 12 and the portable transceiving device 11 according to a second preferred embodiment. Initially the base station transceiving device 11 transmits the preamble and identifier 41 to the portable transceiving device 12. After the base station transceiving device 12 is authenticated, a test signal is transmitted to the portable transceiving device where the frequency of the transmission signal is varied. After each discrete signal 46 is received by the portable transceiving device 12, the RSSI value is measured for each respective discrete signal 46. Upon determining the RSSI value for a respective signal, the RSSI value 47 for the recently transmitted discrete signal is transmitted from the portable transceiving device 11 to the base station transceiving device 12. As each subsequent discrete signal 46 is received by the portable transceiving device 11, the associated RSSI value 47 for each discrete signal 46 is transmitted to the base station transceiving device 12. After all discrete test signals 46 are received and their associated RSSI values 47 are transmitted to the base station transceiving device 12, the controller 23 of the base station transceiving device 12 determines which frequency generated the maximum RSSI value. The transmitting frequency of the base station transceiving device 12 adjusts the transmitting frequency to the frequency associated with the maximum RSSI value for optimizing subsequent transmissions. The remainder of the messages 44 are transmitted to the portable transceiving device using the optimized frequency transmission.

Figure 5:
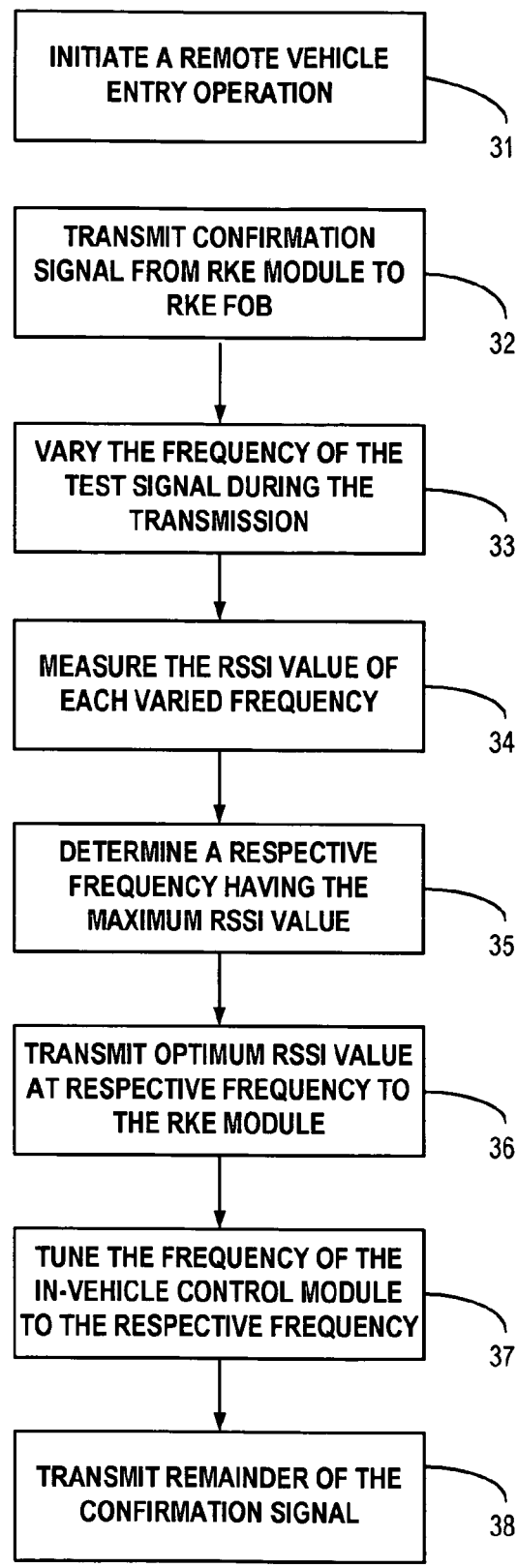
FIG. 5 is a method for self-tuning a transmission signal between a remote transceiving device and a base station transceiving device according to a preferred embodiment of the present invention.

FIG. 5 illustrates a method for self-aligning a transmission signal between a portable transceiving device and a base station transceiving device. In step 31, a remote vehicle entry operation is initiated. The remote vehicle entry operation may include actuating a respective button on a RKE fob for unlocking a vehicle door. In alternative embodiments, other vehicle-based RF applications may include engine start/stop operations, or tire pressure monitoring. In step 32, a confirmation signal is sent from the RKE module to the RKE fob providing status of the requested vehicle entry operation. A portion of the RF signal transmitted includes a RF test signal. In step 33, the frequency of the transmission is varied over a plurality of discrete frequencies during the transmission of the test signal. In step 34, the RSSI value of each discrete frequency is measured. In step 35, the controller of the RKE fob determines which respective frequency produces a maximum RSSI value. In step 36, the optimum RSSI value at the respective frequency is transmitted to the RKE module. In step 37, the RKE module is tuned to the respective frequency producing the maximum RSSI value. The optimum transmitting frequency along with an identification code of the RKE fob is stored in the memory of the RKE module. This allows the RKE module to identify the optimum transmitting frequency for a respective RKE fob if more than one RKE fob is used. In step 38, the remainder of the confirmation message is transmitted by the RKE module to the RKE fob using the respective frequency having the optimum RSSI value.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of self-aligning a transmitting RF frequency between a portable transceiving device and a base station transceiving device, wherein the base station transceiving device is mounted in a vehicle for controlling a vehicle accessory function in response to RF messages broadcast between the transceiving devices, the method comprising said steps of:

transmitting a RF signal from one of a portable or base station transceiving devices to the other of the portable or base station transceiving devices, the RF signal having a frequency that varies during the transmission;

measuring a RSSI value of a received RF signal at selected frequencies by the other of the portable or base station transceiving devices;

transmitting each RSSI value of each varied frequency as measured by the other portable or base station transceiving devices to the one of the portable or base station transceiving devices;

determining a respective frequency having a maximum RSSI value, the determination being made by the one of the portable or base station transceiving devices; and transmitting at least a portion of a subsequent RF message from the one of the portable transceiving device or the base station transceiving device using the respective frequency having the maximum RSSI value.

2. The method of claim 1 wherein the portable transceiver device includes a remote keyless entry (RKE) fob.

3. The method of claim 1 wherein the transceiving device comprises the base station transceiving device.

4. The method of claim 1 wherein the transceiving device comprises the portable transceiving device.

5. The method of claim 1 wherein the frequency of the RF signal is varied over a plurality of discrete frequencies.

6. The method of claim 1 wherein the other transceiving device determines the respective frequency having the maximum RSSI value.

7. The method of claim 1 wherein the other transceiving device measures the RSSI value of each varied frequency, determines the respective frequency having the maximum RSSI value, and transmits the respective frequency to the one transceiving device.

8. The method of claim 1 wherein the one transceiving device transmits the RF signal to the other transceiving device in response to an interrogation signal.

9. The method of claim 1 wherein the one transceiving device transmits the RF signal to the other transceiving device in response to an active activation signal.

10. The method of claim 1 wherein the respective frequency is used to transmit subsequent RF messages by the one of the portable transceiving device or the base station transceiving device until a next respective frequency is determined.

11. A self-aligning remote transmitter system for vehicle based RF applications, said system comprising:

a base station receiving device for receiving a wireless message for controlling an actuation of at least one accessory function;

a portable receiving device for transmitting wireless message to said vehicle based control module for activating said at least one vehicle accessory function;

wherein a RF signal is transmitted from one of said portable or base station transceiving devices to the other of said portable or base station transceiving devices, wherein the RF signal has a frequency that varies during the transmission, wherein a RSSI value is measured at selected frequencies, wherein the other of said portable or base station transceiving device transmits each RSSI value of each varied frequency to the one of said portable or base station transceiving device, wherein a respective frequency having a maximum RSSI value is determined by the one of said portable or base station transceiving devices, and wherein at least a portion of a subsequent RF message is transmitted from said one of said portable transceiving device or said base station transceiving device using a center frequency that is tuned to the respective frequency having said maximum RSSI value.

12. The system of claim 11 wherein said base station receiving device includes a vehicle-based keyless entry module for activating vehicle entry functions.

13. The system of claim 11 wherein said base station receiving device includes a vehicle-based tire pressure monitoring module for monitoring pressure of vehicle tires.

14. The system of claim 11 wherein said base station receiving device includes a vehicle engine start/stop module for starting/stopping an engine of a vehicle.

15. The system of claim 11 wherein said portable receiving device includes a remote entry fob.

16. The system of claim 11 wherein said portable receiving device includes a remote tire pressure sensor disposed is a vehicle tire.

17. The system of claim 11 wherein said portable receiving device includes a remote engine start/top device.

* * * * *

UNITED STATES PATENT AND TRADEMARK OFFICE
CERTIFICATE OF CORRECTION

PATENT NO. : 7,580,696 B2
APPLICATION NO. : 11/011364
DATED : August 25, 2009
INVENTOR(S) : Ghabra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Fourteenth Day of September, 2010

David J. Kappos
*Director of the United States Patent and Trademark Office*